US007845651B2

(12) United States Patent
Yaksich (10) Patent No.: US 7,845,651 B2
(45) Date of Patent: Dec. 7, 2010

(54) LOCKING CHUCK

(75) Inventor: Theodore G. Yaksich, Seneca, SC (US)

(73) Assignee: Jacobs Chuck Manufacturing Company, Clemson, SC (US)

( * ) Notice: Subject to any disclaimer, the term of this patent is extended or adjusted under 35 U.S.C. 154(b) by 1149 days.

(21) Appl. No.: 11/464,678

(22) Filed: Aug. 15, 2006

(65) Prior Publication Data

US 2008/0042375 A1 Feb. 21, 2008

(51) Int. Cl.
*B23B 31/16* (2006.01)
(52) U.S. Cl. ............................ 279/62; 279/140; 279/902
(58) Field of Classification Search ............. 279/60–65, 279/140, 902; *B23B 31/16*
See application file for complete search history.

(56) References Cited

U.S. PATENT DOCUMENTS

| 573,189 | A | 12/1896 | Vogel |
| 1,907,553 | A | 5/1933 | Lundin |
| 2,684,856 | A | 7/1954 | Stoner |
| 3,970,323 | A | 7/1976 | Schnizler, Jr. |
| 4,213,623 | A | 7/1980 | Rohm ......................... 279/1 C |
| 4,272,087 | A | 6/1981 | Rohm |
| 4,302,021 | A | 11/1981 | Rohm ......................... 279/60 |
| 4,395,170 | A | 7/1983 | Clarey |
| 4,498,682 | A | 2/1985 | Glore |
| 4,583,751 | A | 4/1986 | Rohm ......................... 279/1 K |
| 4,627,628 | A | 12/1986 | Rohm |

(Continued)

FOREIGN PATENT DOCUMENTS

DE          2847927          5/1980

(Continued)

OTHER PUBLICATIONS

UK Intellectual Property Office, Examination Report; Sep. 28, 2007.

(Continued)

*Primary Examiner*—Eric A Gates
(74) *Attorney, Agent, or Firm*—Nelson Mullins Riley & Scarborough, LLP (57) ABSTRACT

A chuck includes a generally cylindrical body and a plurality of jaws moveably disposed with respect to the body in communication with the body's axial bore. A generally cylindrical sleeve is rotatably mounted about the body in operative communication with the jaws so rotation of the sleeve in a closing direction moves the jaws towards the axis of the axial bore and rotation of the sleeve in an opening direction moves the jaws away from the axis. A bearing has a first race adjacent the body, a second race adjacent the sleeve and at least one bearing element disposed between the first race and the second race. One of the first race and the second race defines a ratchet. The other of the first race and the second race defines a pawl biased toward the ratchet. The ratchet and the pawl are configured so that when the pawl engages the ratchet, the ratchet and pawl prevent the second race from rotating in the opening direction with respect to the first race. The generally cylindrical sleeve is movable between a first and a second axial position, the first axial position serving to rotationally immobilize the sleeve with respect to the body, and the second axial position allowing the sleeve to rotate freely with respect to the body.

21 Claims, 10 Drawing Sheets

U.S. PATENT DOCUMENTS

| | | | |
|---|---|---|---|
| 4,655,464 A | 4/1987 | Manschitz et al. | |
| 4,682,918 A | 7/1987 | Palm | |
| 4,695,065 A | 9/1987 | Komatsu et al. | |
| 4,700,956 A | 10/1987 | Rohm | |
| 4,703,942 A | 11/1987 | Rohm | |
| 4,836,563 A | 6/1989 | Rohm | |
| 4,840,387 A | 6/1989 | McCarthy | 279/1 K |
| 4,842,288 A | 6/1989 | Ando | |
| 4,951,955 A | 8/1990 | Sakamaki | |
| 4,955,623 A | 9/1990 | Rohm | |
| 4,958,840 A | 9/1990 | Palm | |
| 5,009,439 A | 4/1991 | Sakamaki | |
| 5,031,925 A | 7/1991 | Tatsu et al. | |
| 5,044,643 A | 9/1991 | Nakamura | 279/60 |
| 5,054,796 A | 10/1991 | Rohm | |
| 5,125,673 A | 6/1992 | Huff et al. | 279/60 |
| 5,145,192 A | 9/1992 | Rohm | 279/62 |
| 5,145,193 A | 9/1992 | Rohm | 276/62 |
| 5,171,030 A | 12/1992 | Rohm | |
| 5,172,923 A | 12/1992 | Nakamura | 279/62 |
| 5,174,588 A | 12/1992 | Reibetanz et al. | |
| 5,183,274 A | 2/1993 | Sakamaki | |
| 5,195,760 A | 3/1993 | Wheeler et al. | |
| 5,215,317 A | 6/1993 | Jordan et al. | 279/63 |
| 5,232,230 A | 8/1993 | Lin | 279/62 |
| 5,234,223 A | 8/1993 | Sakamaki | 279/61 |
| 5,236,206 A | 8/1993 | Rohm | |
| 5,261,679 A | 11/1993 | Nakamura | 279/62 |
| 5,286,041 A | 2/1994 | Rohm | |
| 5,322,303 A | 6/1994 | Nakamura | 279/62 |
| 5,330,204 A | 7/1994 | Huff et al. | |
| 5,348,317 A | 9/1994 | Steadings et al. | 279/62 |
| 5,348,318 A | 9/1994 | Steadings et al. | 279/62 |
| 5,375,857 A | 12/1994 | Rohm | |
| 5,375,858 A | 12/1994 | Rohm | |
| 5,411,275 A | 5/1995 | Huff et al. | 279/62 |
| 5,431,419 A | 7/1995 | Mack | 279/62 |
| 5,435,578 A | 7/1995 | Rohm | |
| 5,452,906 A | 9/1995 | Huff et al. | |
| 5,458,345 A | 10/1995 | Amyot | 279/62 |
| 5,464,229 A | 11/1995 | Salpaka | |
| 5,464,230 A | 11/1995 | Rohm | |
| 5,465,983 A | 11/1995 | Owens et al. | |
| 5,476,273 A | 12/1995 | Shadeck et al. | |
| 5,499,829 A | 3/1996 | Rohm | 279/62 |
| 5,499,830 A | 3/1996 | Schnizler | 279/62 |
| 5,501,473 A | 3/1996 | Barton et al. | 279/62 |
| 5,540,453 A | 7/1996 | Sakamaki | |
| 5,573,254 A | 11/1996 | Huff et al. | |
| 5,615,899 A | 4/1997 | Sakamaki | 279/62 |
| 5,624,125 A | 4/1997 | Rohm | |
| 5,709,392 A | 1/1998 | Barton et al. | |
| 5,741,016 A | 4/1998 | Barton et al. | 279/62 |
| 5,775,704 A | 7/1998 | Wilson et al. | 279/62 |
| 5,816,582 A | 10/1998 | Steadings et al. | 279/62 |
| 5,816,583 A | 10/1998 | Middleton | 279/62 |
| 5,826,888 A | 10/1998 | Weaver et al. | 279/23.1 |
| 5,829,761 A | 11/1998 | Rohm | 279/62 |
| 5,833,247 A | 11/1998 | Deuschle et al. | |
| 5,882,153 A | 3/1999 | Mack et al. | 408/240 |
| 5,913,524 A | 6/1999 | Barton | 279/62 |
| 5,924,702 A | 7/1999 | Huff et al. | |
| 5,957,469 A | 9/1999 | Miles et al. | 279/62 |
| 6,022,029 A | 2/2000 | Sakamaki | |
| 6,073,939 A | 6/2000 | Steadings et al. | |
| 6,168,170 B1 | 1/2001 | Miles et al. | |
| 6,179,301 B1 | 1/2001 | Steadings et al. | |
| 6,196,554 B1 | 3/2001 | Gaddis et al. | |
| 6,217,033 B1 | 4/2001 | Sakamaki et al. | |
| 6,260,856 B1 | 7/2001 | Temple-Wilson | 279/62 |
| 6,264,208 B1 | 7/2001 | Sakamaki et al. | |
| 6,302,407 B1 | 10/2001 | Hsueh | |
| 6,390,481 B1 * | 5/2002 | Nakamuro | 279/62 |
| 6,398,226 B1 | 6/2002 | Huggins et al. | |
| 6,402,160 B1 | 6/2002 | Grogan et al. | |
| 6,409,181 B1 | 6/2002 | Hsueh | |
| 6,435,521 B2 | 8/2002 | Steadings et al. | 279/62 |
| 6,488,287 B2 | 12/2002 | Gaddis et al. | |
| 6,517,088 B1 | 2/2003 | Rohm | |
| 6,550,785 B2 | 4/2003 | Rohm | |
| 6,575,478 B2 | 6/2003 | Rohm et al. | |
| 6,659,474 B2 | 12/2003 | Sakamaki et al. | |
| 6,729,812 B2 | 5/2004 | Yaksich et al. | |
| 6,824,141 B1 | 11/2004 | Sakamaki et al. | |
| 6,832,764 B2 | 12/2004 | Steadings et al. | |
| 6,843,485 B2 | 1/2005 | Sakamaki et al. | |
| 6,902,171 B2 | 6/2005 | Sakamaki et al. | |
| 6,959,931 B2 | 11/2005 | Sakamaki et al. | |
| 7,128,503 B2 | 10/2006 | Steadings et al. | |
| 7,207,573 B2 | 4/2007 | Sakamaki et al. | |
| 7,360,770 B2 * | 4/2008 | Luckenbaugh et al. | 279/62 |
| 7,527,273 B2 * | 5/2009 | Bordeianu | 279/62 |
| 2003/0026670 A1 * | 2/2003 | Temple-Wilson | 408/240 |
| 2006/0038359 A1 | 2/2006 | Luckenbaugh et al. | 279/62 |
| 2007/0069483 A1 * | 3/2007 | Bordeianu et al. | 279/62 |

FOREIGN PATENT DOCUMENTS

| | | |
|---|---|---|
| DE | 3406668 | 9/1985 |
| DE | 3418881 | 11/1985 |
| DE | 3617105 | 11/1987 |
| DE | 3914311 | 6/1990 |
| DE | 4238503 | 11/1993 |
| DE | 19506708 | 3/1996 |
| DE | 29600727 | 4/1996 |
| DE | 4438991 | 5/1996 |
| EP | 0300375 | 1/1989 |
| EP | 0468128 | 1/1992 |
| EP | 0618029 | 10/1994 |
| EP | 0677348 | 10/1995 |
| EP | 0710518 | 5/1996 |
| EP | 0710519 | 5/1996 |
| EP | 0710520 | 5/1996 |
| EP | 0519412 | 3/1997 |
| EP | 1159102 | 9/2004 |
| FR | 002645056 | 10/1990 |
| GB | 2034210 | 6/1980 |
| GB | 2428609 | 2/2007 |
| GB | 2429668 | 3/2007 |
| JP | 57-4840/1982 | 3/1982 |
| JP | 1-92009/1989 | 4/1989 |
| JP | 1-289608/1989 | 11/1989 |
| JP | 3-49808/1991 | 3/1991 |
| JP | 3-270809/1991 | 12/1991 |
| JP | 4365504 | 12/1992 |
| JP | 8-90316/1996 | 4/1996 |
| JP | 2001-259907 | 9/2001 |
| WO | 2006/125146 | 11/2006 |

OTHER PUBLICATIONS

First Office Action issued by Chinese Patent Office, dated Jan. 22, 2010, for co-pending Chinese Patent Application No. 200710141161.2.

* cited by examiner

LOCKING CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or actuation of the driver motor.

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120° apart from each other. The passageways are configured so that their center lines meet at a point along the chuck axis forward of the chuck. The passageways constrain three jaws which are movable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached to the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Examples of such chucks are disclosed in U.S. Pat. Nos. 5,125,673 and 5,193,824, the entire disclosures of which are incorporated by reference herein. Various configurations of keyless chucks are known in the art and are desirable for a variety of applications.

SUMMARY OF THE INVENTION

The present invention recognizes and addresses the foregoing considerations, and others, of prior art constructions and methods.

An embodiment of the present invention includes a chuck for use with a manual or powered driver having a rotatable drive shaft. The chuck includes a generally cylindrical body having a nose section and a tail section. The tail section is configured to rotate with the drive shaft, and the nose section has an axial bore formed therein. A plurality of jaws is movably disposed with respect to the body and in communication with the axial bore. A generally cylindrical sleeve is rotatably mounted about the body in operative communication with the jaws so that rotation of the sleeve in a closing direction moves the jaws toward the axis of the axial bore and rotation of the sleeve in an opening direction moves the jaws away from the axis. The sleeve is also slidable between a first axial position and a second axial position. A bearing has a first race adjacent the body, a second race adjacent the sleeve and at least one bearing element disposed between the first race and the second race. One of the first race and the second race defines a ratchet. The other of the first race and the second race defines a pawl biased toward the ratchet. The ratchet and the pawl are configured so that when the pawl engages the ratchet, the ratchet and the pawl prevent the second race from rotating in the opening direction with respect to the first race.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the present disclosure.

Figure 1A:
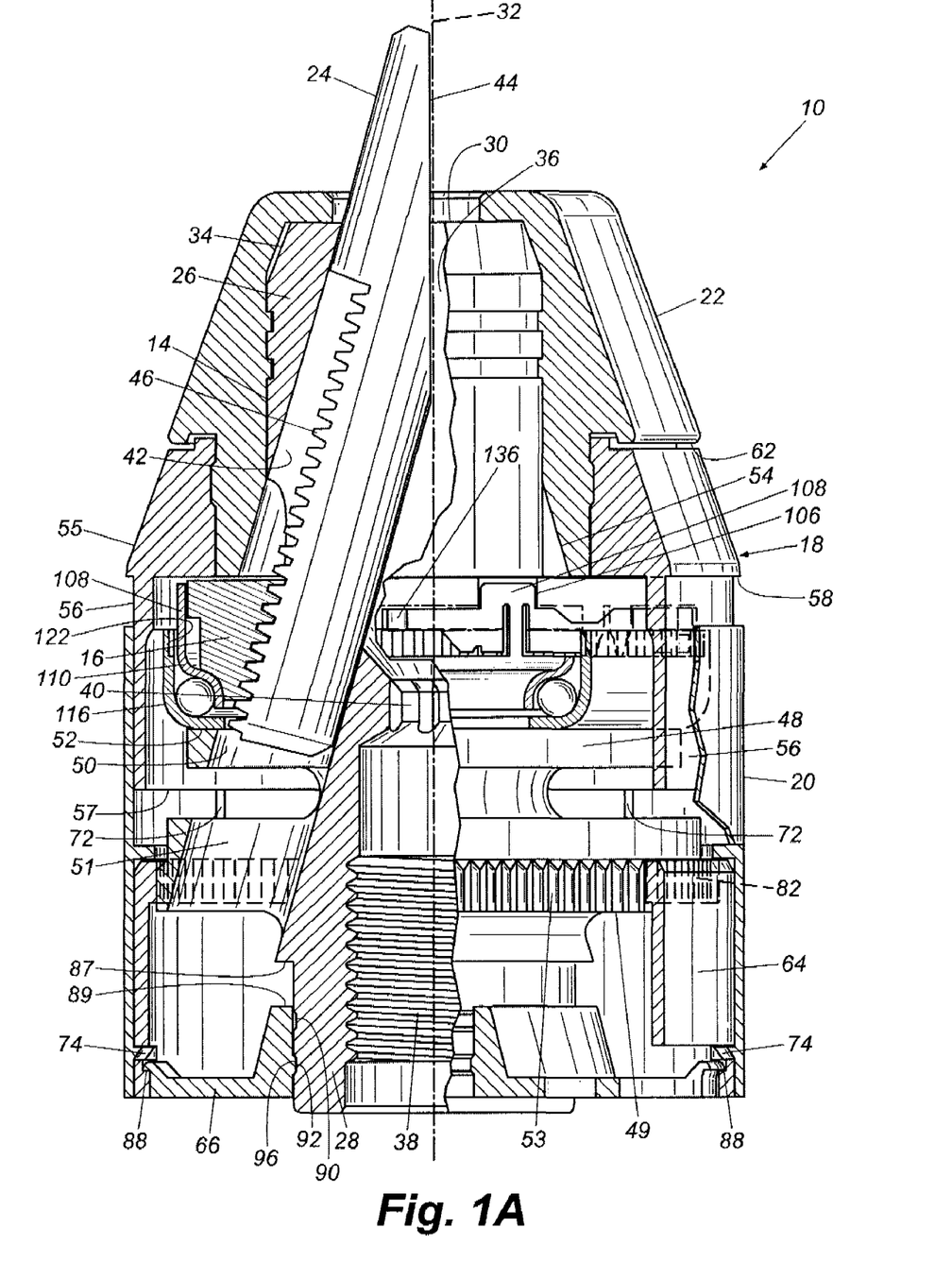
FIG. 1A is a longitudinal view, partly in section, of a chuck in accordance with the present invention, shown in a locked position.
Figure 1B:
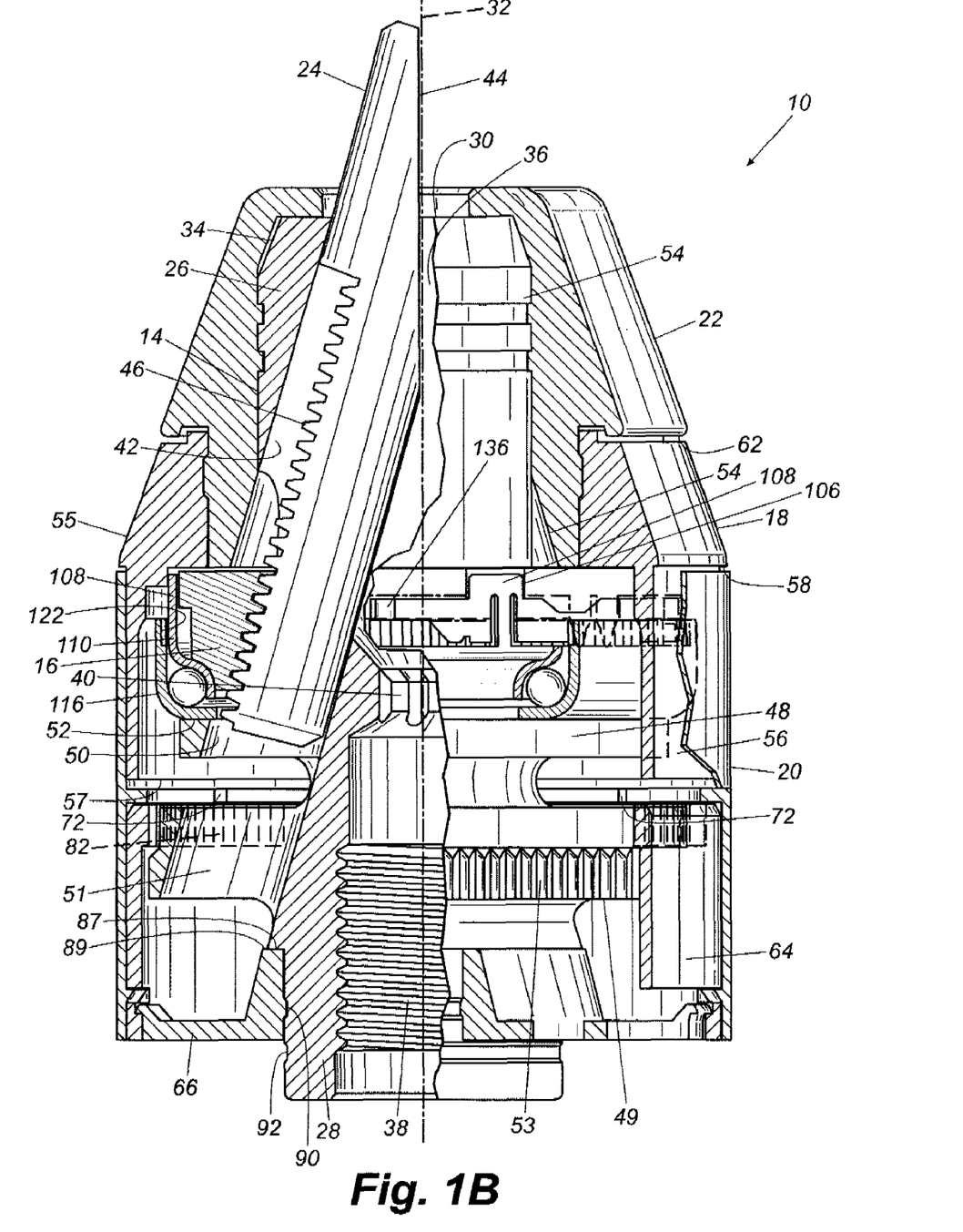
FIG. 1B is a longitudinal view, partly in section, of the chuck shown as in FIG. 1A in an unlocked position.
Figure 2:
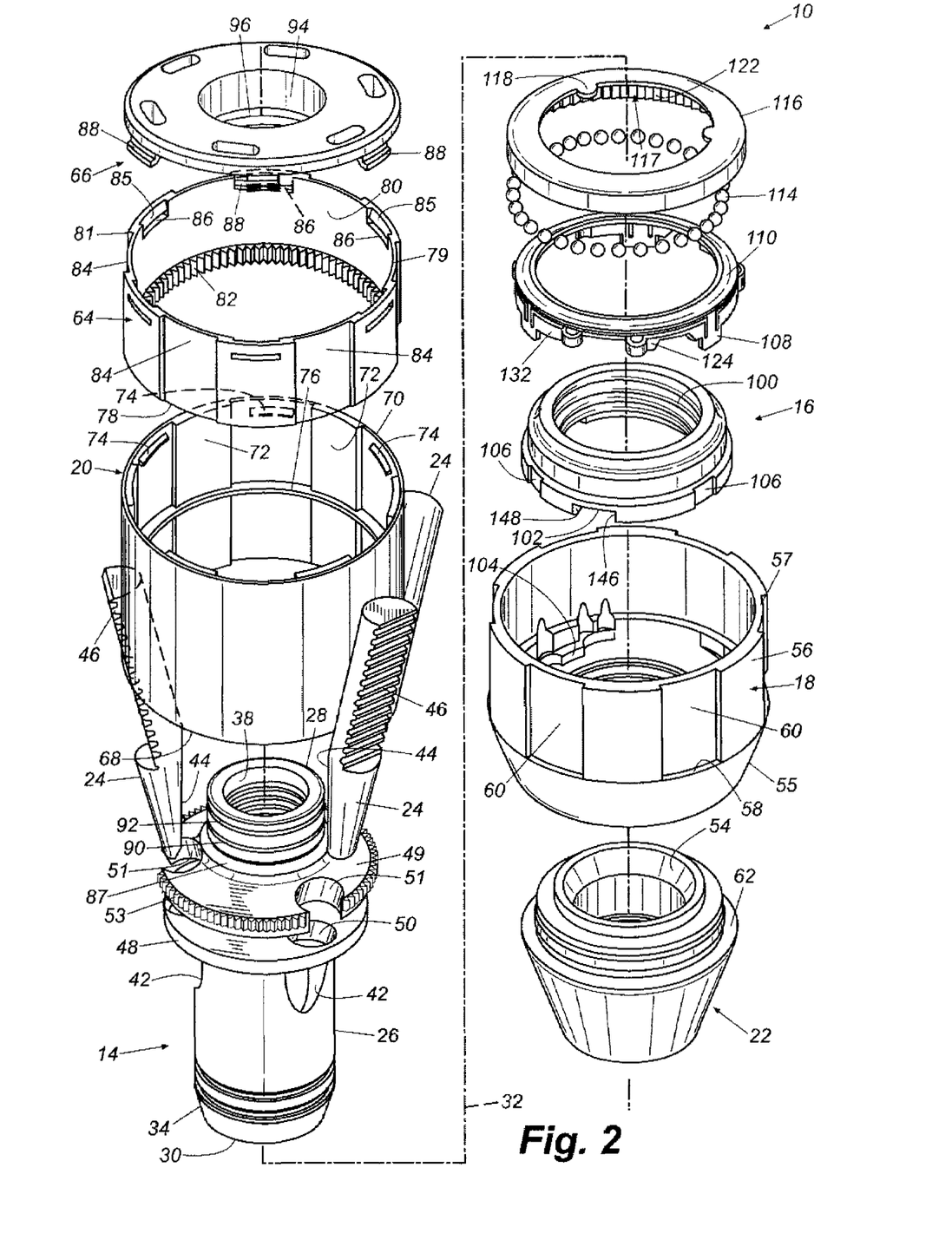
FIG. 2 is an exploded perspective view of the chuck as shown in FIG. 1A.

Referring to FIGS. 1A, 1B, and 2, an embodiment of a chuck 10 of the present invention includes a body 14, a nut 16, a front sleeve 18, a rear sleeve 20, a nose piece 22 and a plurality of jaws 24. Body 14 is generally cylindrical in shape and includes a nose or forward section 26 and a tail or rearward section 28. Nose section 26 has a front face 30 transverse to a central longitudinal axis 32 of body 14 and a tapered surface 34 at its forward end. The nose section defines an axial bore 36 (FIGS. 1A and 1B) that is dimensioned somewhat larger than the largest tool shank that the chuck is designed to accommodate. An axial bore 38 is also formed in tail section 28 and is of a standard size to mate with the drive shaft of a powered or hand driver (not shown). Bores 36 and 38 may communicate at a central region 40 (FIGS. 1A and 1B) of body 14. While bore 38 is illustrated as having threads, the bore could be replaced with a tapered bore of a standard size to mate with a tapered drive shaft. Furthermore, body 14 may be formed integrally with the drive shaft.

Figure 5:
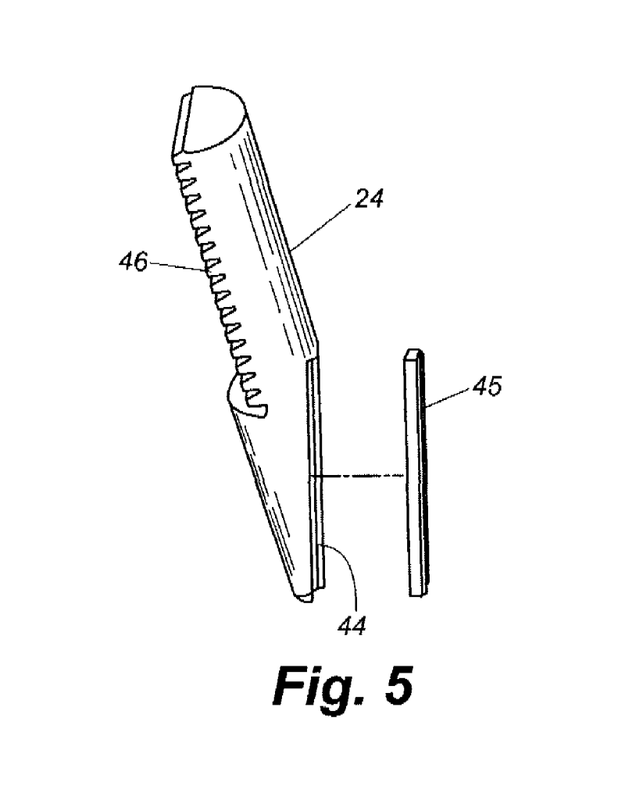
FIG. 5 is a perspective view of a chuck jaw of the chuck as shown in FIG. 1A.

Body 14 defines three passageways 42 to accommodate the three jaws. Each jaw is separated from the adjacent jaw by an arc of approximately 120°. Passageways 42 and jaws 24 are angled with respect to the chuck's central longitudinal axis 32 such that each passageway central axis (not shown) travels through axial bore 36 and intersects central longitudinal axis 32 at a common point ahead of the chuck body. Each jaw 24 has a tool engaging face 44 disposed at such an angle that when jaws 24 are inserted into their respective passageways 42, each tool engaging face 44 is aligned generally parallel to central longitudinal axis 32 of chuck body 14. Threads 46, formed on the jaw's opposite or outer surface, may be constructed in any suitable type and pitch. As shown in FIG. 5, each jaw 24 may be formed with a carbide insert 45 pressed into its tool engaging surface.

Body 14 includes a thrust ring 48 located intermediate the body nose section 26 and tail section 28. Body 14 also includes a gear ring 49 located axially aft of thrust ring 48. Both thrust ring 48 and gear ring 49 may be integral components of the body, but it should be understood that thrust ring 48 and gear ring 49 may both be formed as separate components that are rigidly attached to body 14. Thrust ring 48 includes a plurality of jaw guideways 50 formed around its circumference to permit retraction of jaws 22 therethrough and also includes a ledge portion 52 to receive a bearing assembly as described below. Ledge portion 52 is most clearly shown in FIG. 8. Gear ring 49 also defines a plurality of jaw guideways 51 that permit the retraction of jaws 24 therethrough. Additionally, gear ring 49 defines a plurality of gear teeth 53 that extend radially outward from the outer circumference of the gear ring.

Nose piece 22 retains nut 16 against forward axial movement. At its rearward end, nose piece 22 has a frusto-conical section 54 that accommodates for the advancement and retraction of jaws 24 within the chuck. In a preferred embodiment, nose piece 22 is press-fitted onto body nose section 26, but it should be understood that nose piece 22 may be omitted from the chuck in favor of other methods of axially securing the nut to the body. For example, the nut may be a two-piece nut held on the body within a circumferential groove formed on the outer circumference of the body. Preferably, nose piece 22 is constructed out of a metal or metal alloy, and may be coated with a non-ferrous metallic coating to prevent rust and to enhance its appearance. Any suitable coating could be utilized including anodizing, chrome plating, powder coating, and zinc or nickel plating.

Front sleeve 18 has a frusto-conical forward section 55, a generally cylindrical rear section 56, a step surface 58 intermediate the forward and rear sections, and a rear surface 57. Rear section 56 defines a plurality of axially extending recesses 60 (FIG. 2) that extend inwardly from the outer surface of rear section 56. Nose piece annular shoulder 62 secures the front sleeve from movement in the forward axial direction.

Figure 6:
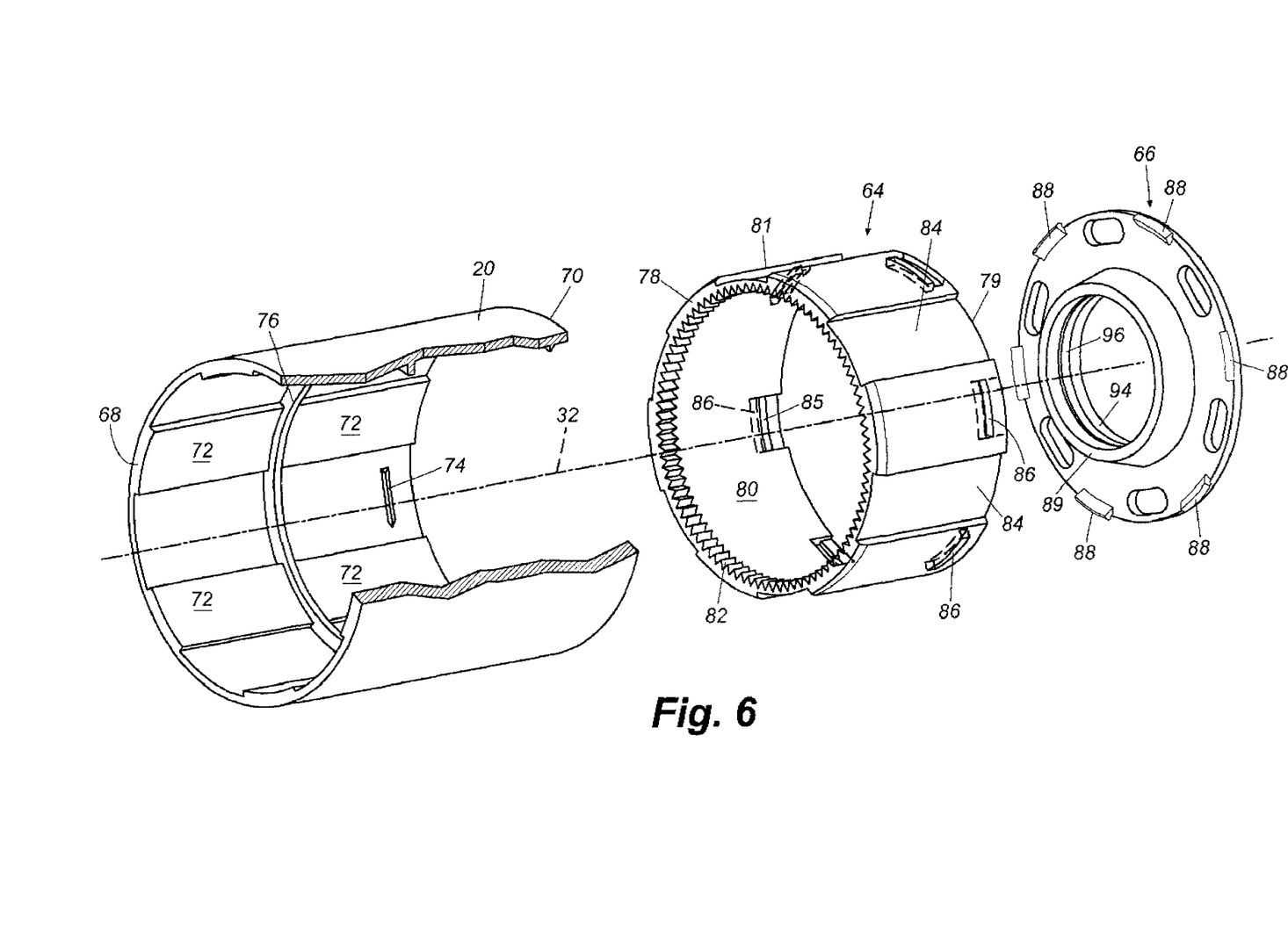
FIG. 6 is an exploded perspective view, partly in section, of a rear sleeve of the chuck as shown in FIG. 1A.
Figure 7:
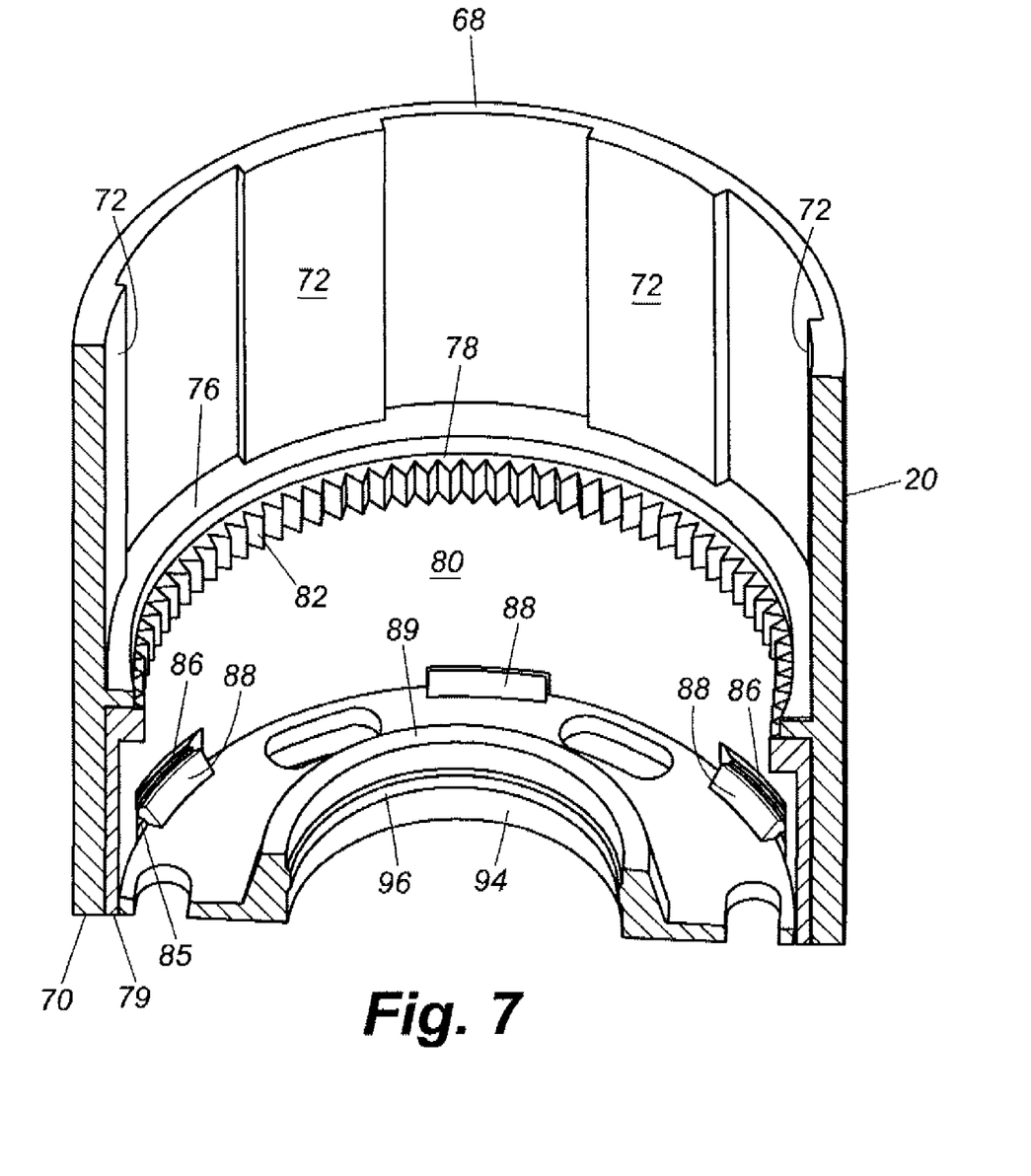
FIG. 7 is a perspective view, in section, of the rear sleeve of the chuck as shown in FIG. 1A.

As best seen in FIGS. 2, 6, and 7, rear sleeve 20 lockingly receives a gear sleeve 64 and a rear plate 66. Rear sleeve 20 has a forward surface 68 and a rearward surface 70. Rear sleeve 20 also defines a plurality of lands 72 that extend radially inward from the rear sleeve's inner circumference. Between each land, rear sleeve 20 defines a radially inwardly protruding locking tab 74 located proximate to rear sleeve rearward surface 70. Additionally, rear sleeve 20 defines a positioning ring 76 that extends radially inward from the inner surface of the rear sleeve and is located intermediate the rear sleeve forward and rearward surfaces. Additionally, rear sleeve 20 may be grooved or knurled on its outer circumferential surface to aid the operator when hand-gripping the outer sleeve.

Gear sleeve 64 has a front surface 78, a rear surface 79, an inner circumferential surface 80, and an outer circumferential surface 81 (FIGS. 2 and 6). Gear sleeve 64 defines a plurality of gear teeth 82 that protrude radially inward from the inner circumferential surface of gear sleeve 64 and are located proximate to gear sleeve front surface 78. Additionally, gear sleeve outer circumferential surface 81 defines a plurality of radially inward extending channels 84, similar to recesses 60 defined by front sleeve 18 and sized to accept rear sleeve lands 72. Between each recess, gear sleeve 64 defines a groove 85 and a slot 86, proximate to the gear sleeve rear surface 79. Groove 85 and slot 86 are adjacent to each other and are aligned along the chuck central longitudinal axis 32, such that each groove is located proximate to rear sleeve surface 79 and each slot is located distal from rear sleeve surface 79 as shown in FIG. 6.

During assembly of chuck 10, gear sleeve 64 is inserted into rear sleeve 20. Gear sleeve channels 84 and rear sleeve lands 72 form a non-rotatably interlocking connection. Gear sleeve 64 is inserted into rear sleeve 20 until gear sleeve front surface 78 engages rear sleeve positioning ring 64 and rear sleeve locking tabs 74 securely snap into their respective gear sleeve slots 86. Once fully inserted into rear sleeve 20, rear plate 66 is inserted into gear sleeve 58 proximate to gear sleeve rear surface 79. Rear plate 66 defines a plurality of tabs 88 that are each slidably received by a respective gear sleeve groove 85. When fully inserted, each tab 88 is lockably received by a gear sleeve slot 86. When fully assembled, rear sleeve 20, gear sleeve 64 and rear plate 66 form a unitary assembly.

Figure 8:
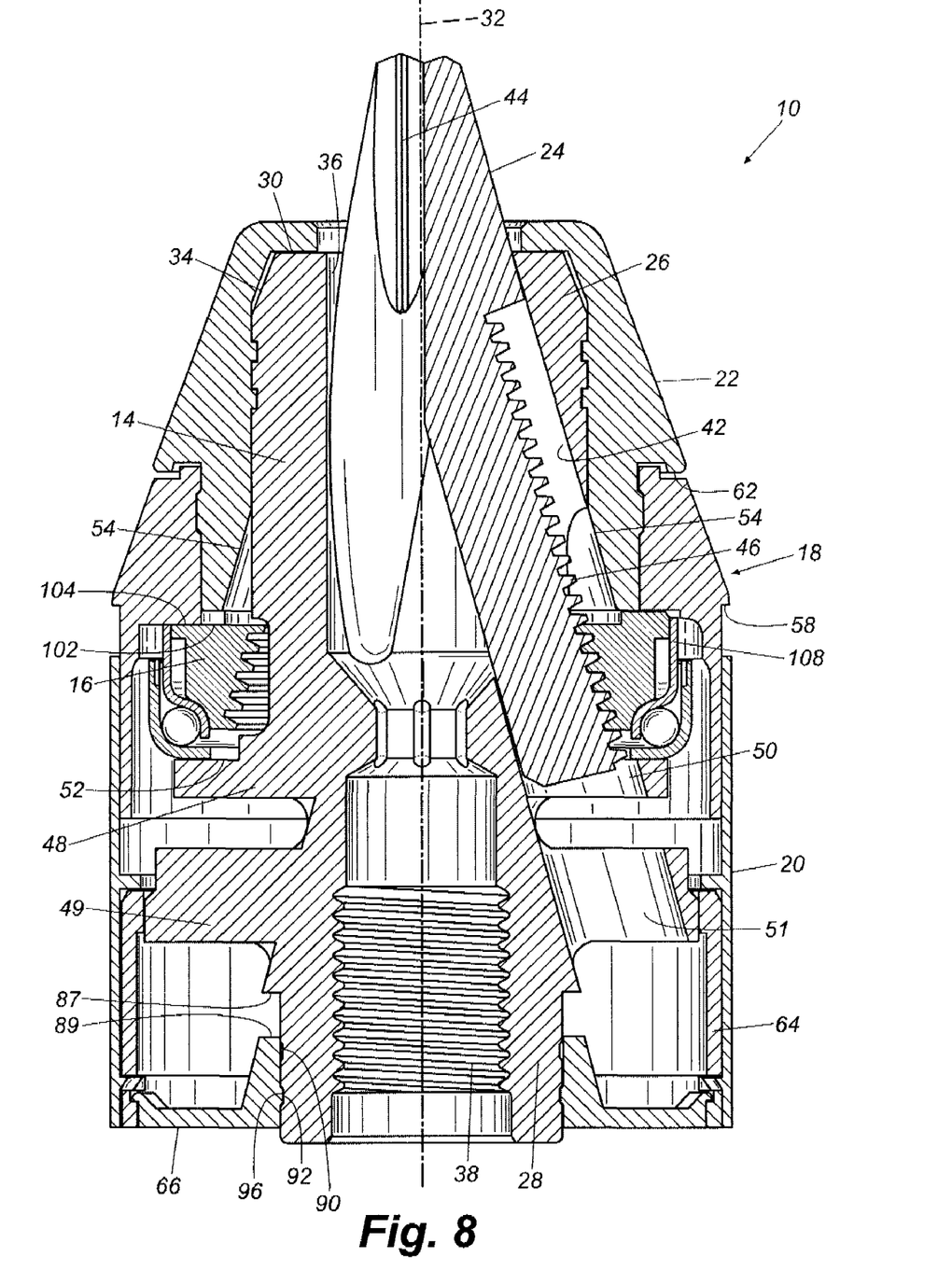
FIG. 8 is a longitudinal view, in section, of the chuck as shown in FIG. 1A.

As shown in FIGS. 1A, 1B, 2, and 8, body tail section 28 defines a forward detent groove 90 located proximate to gear ring 49, a ledge 87 located between the forward detent groove and the gear ring, and a rearward detent groove 92 located aft of forward groove 90. Rear plate 66 defines a central bore 94 that is sized appropriately to slidably receive body tail section 28. Additionally, central bore 94 defines a nose 89 and a detent bulb 96 that is sized appropriately to releasably engage either the forward or rearward detent groove. In this way, rear plate 66, and therefore gear sleeve 64 and rear sleeve 20, may be slidably moved between a rearward axial position, as shown in FIGS. 1A and 8, where detent bulb 96 engages rearward detent groove 92, and a forward axial position, shown in FIG. 1B, where bore nose 89 engages ledge 87 and the detent bulb engages the forward detent groove 90.

Figure 9A:
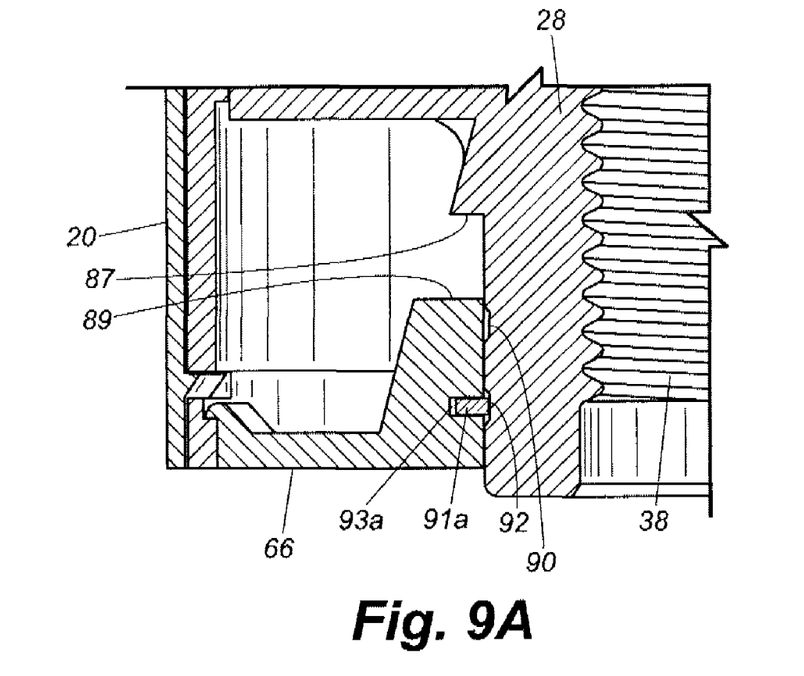
FIG. 9A is a partial cross-sectional view of an alternate embodiment of the chuck as shown in FIG. 1A.
Figure 9B:
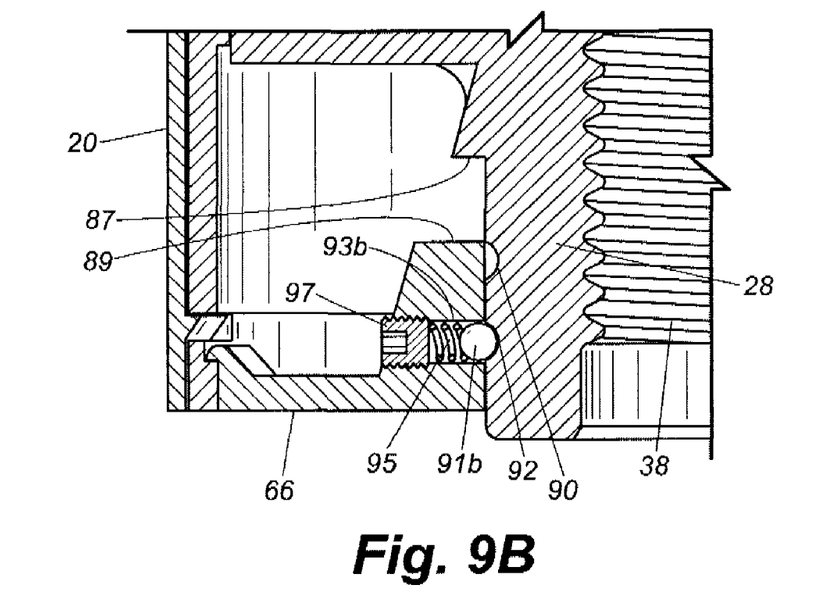
FIG. 9B is a partial cross-sectional view of an alternate embodiment of the chuck as shown in FIG. 1A.

Alternative means of releasably enagaging body tail section forward and rearward detent grooves 90 and 92 are shown in FIGS. 9A and 9B. Referring to FIG. 9A, a C-ring 91a is shown engaging rearward detent groove 92. As shown, rear plate 66 includes an annular groove 93a that receives C-ring 91a. As the user urges rear sleeve 20 from its rearward position into a forward position, detent groove 90 causes the C-ring to expand and allow rear sleeve 20 and rear plate 66 to slide forward. As the rear sleeve and rear plate reach the forward position, the C-ring encounters forward detent groove 90. C-ring 91a contracts into the forward detent groove and the rear sleeve is releasably held in the forward position. Referring now to FIG. 9B, a ball detent 91*b* is shown engaging rearward detent groove 92 that is shaped to releasably accept ball detent 91*b*. Rear plate 66 includes a detent port 93*b* into which the detent ball and a biasing element 95 are inserted. A plug 97 is used to seal the port and to provide a surface against which biasing element 95 acts when urging the detent ball into engagement with detent grooves 90 and 92. As the user urges rear sleeve 20 from its rearward position into a forward position, contact between the forward edge of rear detent groove 92 and detent ball 91*b* compresses biasing member 95 and allows rear sleeve 20 and rear plate 66 to slide forward. As the rear sleeve and the rear plate reach the forward position, biasing member 95 expands and urges the detent ball into engagement with forward detent groove such that the rear sleeve is releasably held in the forward position.

As rear sleeve 20 slides from a forward position and a rearward position, gear sleeve gear teeth 82 engage gear ring teeth 53 as shown in FIG. 1A. When rear sleeve 20 is in its rearward position, the engagement between gear sleeve teeth 82 and gear ring teeth 53 rotationally fixes rear sleeve 20 to chuck body 14. Sliding rear sleeve 20 back into a forward position causes the gear sleeve teeth to disengage the gear ring teeth, thus allowing the front and rear sleeves to rotate freely with respect to the chuck body. As described in greater detail below, the locking engagement between gear sleeve teeth 82 and gear ring teeth 53 prevents chuck jaws 24 from further tightening or loosening about the shank of a tool inadvertently.

Referring to FIG. 2, front sleeve 18 facilitates the sliding of rear sleeve 20 between its forward and rearward positions. Front sleeve recesses 60 are sized appropriately to slidably receive rear sleeve dogs 72. Flats 72 and recesses 60 form a sliding yet interlocked engagement between the front and rear sleeves. Accordingly, when rear sleeve 20 is rotated, the interlocking connection between the flats and the recesses causes front sleeve 18 to be rotated in unison with rear sleeve 20. Accordingly, when the rear sleeve is located in its forward position, both the rear sleeve and the front sleeve freely rotate in unison with respect to chuck body 14. However, when rear sleeve 20 is placed in its rearward position, the locking engagement between gear sleeve teeth 82 and gear ring teeth 53 rotationally fixes the front and rear sleeves with respect to the chuck body. An alternative embodiment of the chuck of the present invention may be arranged such that gear sleeve teeth 84 and gear ring teeth 53 are in locking engagement when rear sleeve 20 is placed in a forward position and are disengaged when the rear sleeve is placed in its rearward position, as opposed to the above-disclosed arrangement.

The front and rear sleeves may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials from which the chuck is fabricated will depend on the end use of the chuck.

Figure 3:
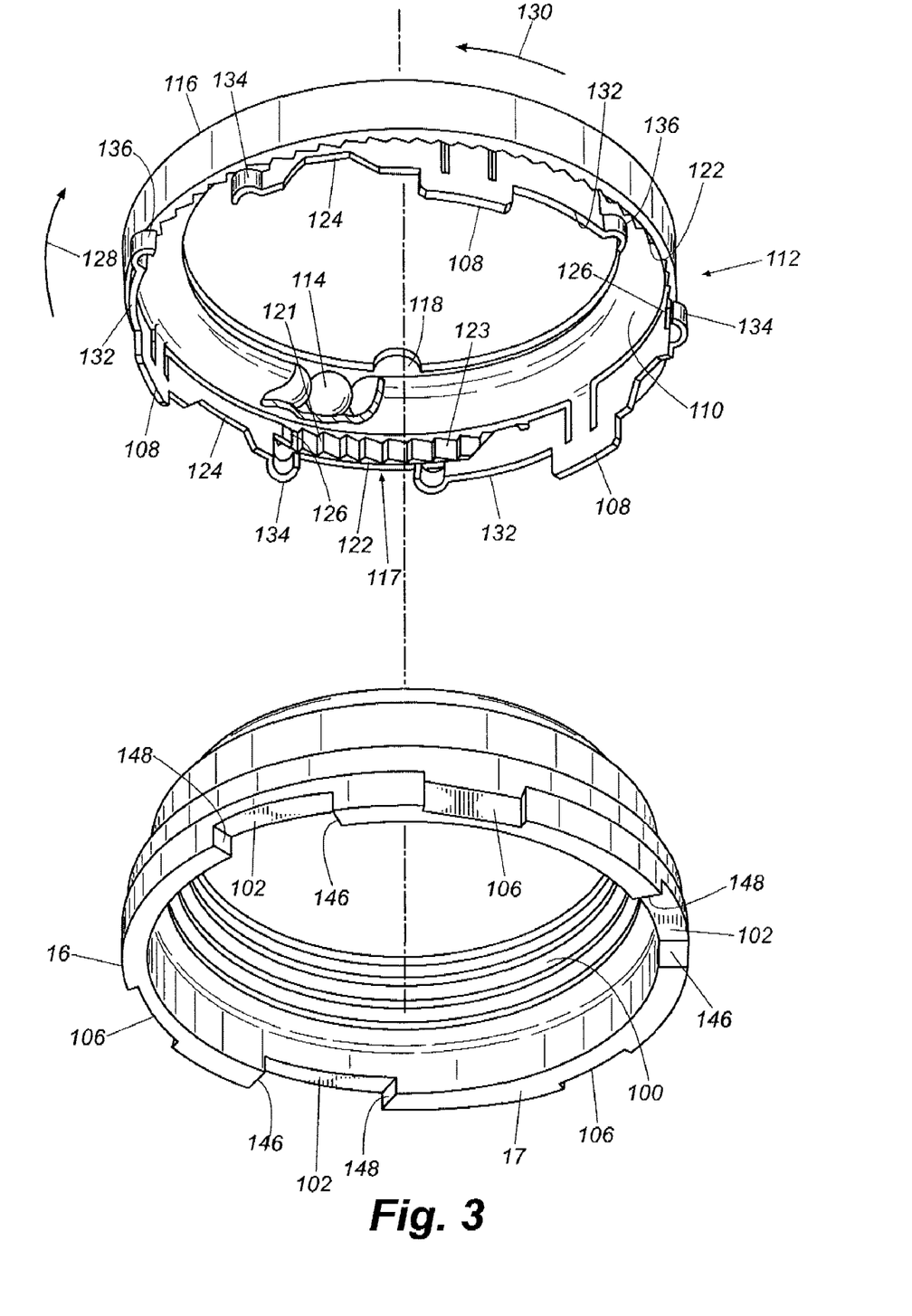
FIG. 3 is an exploded perspective view of the bearing and nut of the chuck as shown in FIG. 1A.

Referring to FIGS. 2 and 3, nut 16 has threads 100 for mating with jaw threads 46. Nut 16 is positioned about the body in engagement with the jaw threads so that when the nut is rotated with respect to body 14, the jaws will be advanced or retracted depending on the direction of rotation. Nut 16 has a forward axial face 17 that defines recesses 102 that receive respective drive dogs 104 (FIGS. 2, and 4A-4C) extending from the inner surface of front sleeve 18. The angular width of the drive dogs is less than that of the recesses, resulting in a slight range of relative rotational movement, for example between 6° and 10°, between the nut and the front sleeve.

Nut 16 also defines a plurality of grooves formed as flats 106 about the nut's outer circumference. Flats 106 receive respective tabs 108 extending forward from an inner race 110 of a bearing assembly 112 (FIG. 3). The engagement of tabs 108 and flats 106 rotationally fixes the inner race to the nut, although it should be understood that there may be a slight rotational tolerance between the two parts.

Inner race 110 receives a plurality of bearing elements, in this case bearing balls 114, disposed between it and an outer race 116 seated on thrust ring ledge 52 (FIGS. 1A and 1B). Outer race 116 is rotationally fixed to body 14 by a plurality of tabs 118 received in corresponding grooves (not shown) in thrust ring ledge 52. In an alternate embodiment of the invention, outer race 116 may be rotationally free with respect to the thrust ring, and, therefore, tabs 118 and their corresponding grooves are omitted. In such an embodiment, outer race 116 can rotate with respect to the body until the jaws close onto a tool shank, at which point rearward force from the nut through the bearing gives rise to friction between outer race 116 and the thrust ring that holds the outer race in place rotationally on the body.

Inner race 110 and outer race 116 are both shaped appropriately to locate the plurality of bearing balls 114 and prevent the bearing balls from migrating within the chuck during operation. In addition to locating bearing balls 114, outer race 116 also includes a ratchet ring 117 formed by a plurality of saw tooth-shaped teeth 122 disposed about the inner circumferential surface of the outer race. As previously mentioned, inner race 110 defines a plurality of tabs 108 that engage nut 16 (FIG. 2). A first pawl 124 extends from one side of each tab 108, as shown in detail in FIG. 3. Each first pawl 124 is equipped with a distal end 126 that selectively engages the saw tooth-shaped teeth 122 disposed on outer race 116. First pawls 124 is biased radially outward from inner race 110 and must be compressed radially inward during assembly in order to bring distal ends 126 into the proper engagement with teeth 122. The radially outward bias of first pawls 124 urges distal end 126 of each pawl towards the teeth of outer race ratchet ring 117.

Referring with particularity to FIG. 3, each tooth 122 has a first side 121 and a second side 123, where first side 121 has a slope approaching 90° and second side 123 has a slope that is approximately perpendicular to first side 121. First pawls 124 are deflectable and are generally disposed such that distal end 126 in alignment with the slope of teeth second sides 123. Thus, as inner race 110 rotates in a jaw-closing direction 128 with respect to outer race 116, first pawl distal ends 126 repeatedly slip over teeth 122, causing a clicking sound as each distal end 126 falls against each subsequent tooth second side 123. This configuration of teeth and first pawls 124, however, prevents the inner race's rotation in an opposite, jaw-opening direction 130. Application of rotational force to the inner race in direction 130 forces distal ends 126 into the steep slope of the teeth first sides 121. Since the leading edge of each distal end 126 is generally perpendicular to the teeth first sides 121, engagement between pawl distal ends 126 and the teeth first sides 121 will not cause the first pawls to deflect radially inward so that inner race 110 can rotate in direction 130 with respect to outer race 116. Accordingly, when first pawl distal ends 126 engage ratchet teeth 122, the teeth permit the inner race to rotate only in jaw-closing direction 128 but prevent the inner race from rotating in jaw-opening direction 130.

Figure 4A:
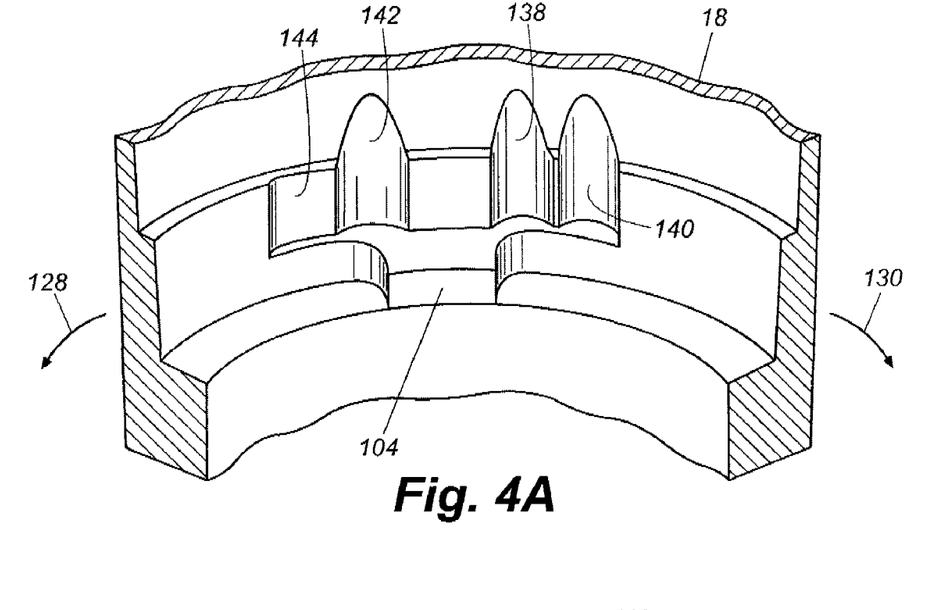
FIG. 4A is a partial perspective view of the front sleeve of the chuck as shown in FIG. 1A.

A second deflectable pawl 132 extends from each tab 108 opposite from first pawl 124. Like first pawls 124, each second pawl 132 is biased radially outward. However, unlike the first pawls, the second pawls do not engage the outer race ratchet ring 117. Pawls 124 and 132 include tabs 134 and 136, respectively, at their distal ends. Referring also to FIG. 4A, an inner circumferential surface of sleeve 18 defines first and second recesses 138 and 140. During the chuck's operation, each tab 136 is received in one of these recesses, depending on the sleeve's rotational position with respect to the nut as discussed in more detail below. The sleeve also defines a third recess 142 and a cam surface 144. Also depending on the sleeve's rotational position, each tab 134 is received either by a cam surface 144 or by a third recess 142.

Figure 4B:
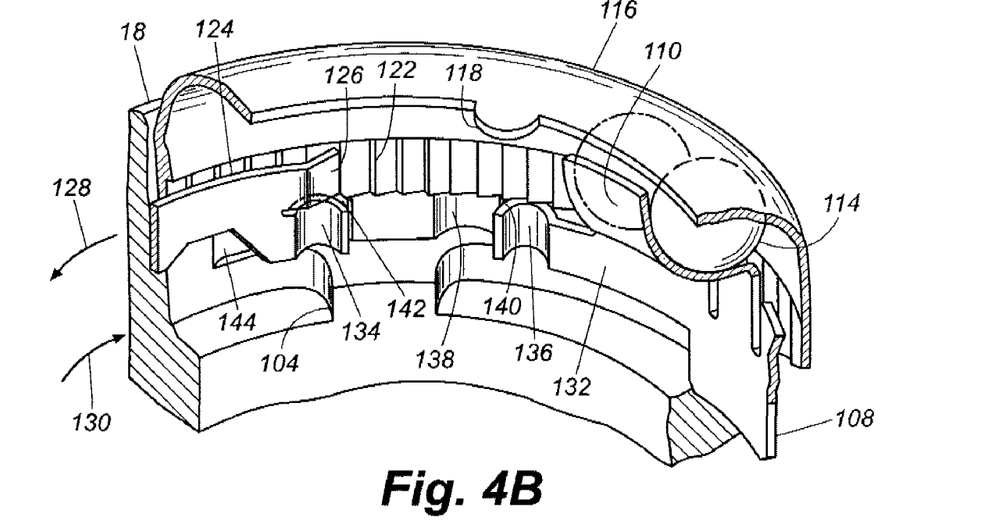
FIG. 4B is a partial perspective view of the bearing and sleeve of the chuck as shown in FIG. 1A.
Figure 4C:
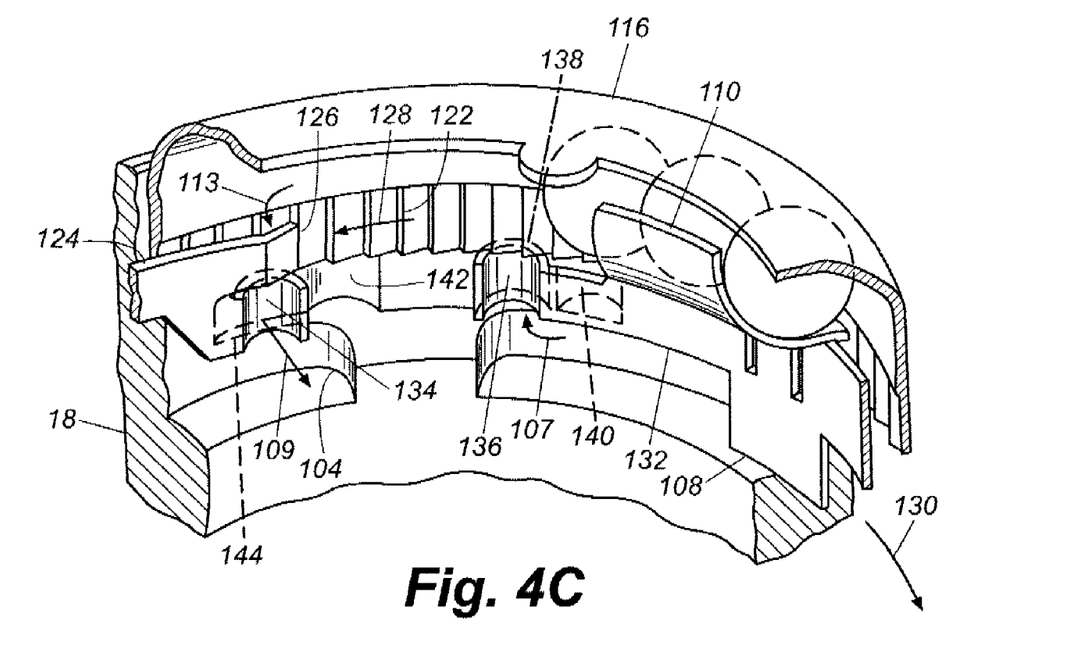
FIG. 4C is a partial perspective view of the bearing and sleeve of the chuck as shown in FIG. 1A.

FIG. 4C illustrates the disposition of pawls 124 and 132 when sleeve 18 is in a first (unlocked) of two positions with respect to nut 16 (FIG. 2), while FIG. 4B illustrates these components when the sleeve is in a second (locked) position with respect to the nut. For ease of illustration, both figures omit the nut. As shown in FIG. 4B, each drive dog 104 is disposed against or adjacent to a side 146 of a recess 102 (FIG. 3) in which it is received. Each of the sleeve's second recesses 140 receives a tab 136 of a second pawl 132, and each third recess 142 receives a tab 134 of a first pawl 124. Accordingly, distal end 126 of each first pawl 124 engages ratchet teeth 122, and inner race 110 can rotate only in jaw-closing direction 128 with respect to outer race 116.

Referring now to FIG. 4C, when front sleeve 18 moves in jaw-opening direction 130 with respect to outer race 116, each tab 136 moves out of its second recess 140 and into its first recess 138, as indicated by arrow 107. Each tab 134 rides up and out of its third recess 142 onto its cam surface 144, as indicated by arrow 109. As indicated by arrow 113, this pushes each deflectable first pawl 124 radially inward, thereby disengaging distal ends 126 from ratchet teeth 122. Thus, inner race 110 is free to rotate with respect to outer race 116.

As described in more detail below, when sleeve 18 rotates in direction 130 with respect to outer race 116 so that the inner race moves from the position shown in FIG. 4B to the position shown in FIG. 4C, drive dogs 104 move within recesses 102 of nut 16 (FIG. 3) so that each drive dog engages or is positioned immediately adjacent to a side 148 (FIG. 3) of its respective recess 102.

In operation, opening and closing of jaws 24 can only occur when rear sleeve 20 is placed in a forward position, so as to disengage gear sleeve teeth 84 from gear ring teeth 53 as shown in FIG. 1B. Disengaging teeth 82 from teeth 53 permits front sleeve 18 and rear sleeve 20 to rotate freely with respect to chuck body 14 and allows nut 16 to advance or retract jaws 24 as described below. Referring to FIGS. 2, 3, 4B and 4C, when the chuck is between fully opened and fully closed positions, nut recesses 102 receive front sleeve drive dogs 104 so that the drive dogs are adjacent recess sides 148. Referring to FIG. 4C, inner race 110 is disposed with respect to front sleeve 18 so that tabs 134 and 136 are received by cam surface 144 and first recess 138, respectively. In this arrangement, sleeve 18 is in the first, unlocked position with respect to nut 16. In this condition, tabs 136 and first recesses 138 rotationally fix inner race 110 to sleeve 18. Since inner race 110 is rotationally fixed to nut 16 by tabs 108 and flats 106, an operator rotating front sleeve 18 and rear sleeve 20 also rotates bearing inner race 110, which, in turn, rotationally drives the nut, and jaws 24 respond by opening or closing. If the operator rotates the sleeves in closing direction 128 (FIG. 4C) until the jaws tighten onto a tool shank (not shown), further rotation of the front and rear sleeves will urge nut 16 axially rearward, thereby pushing the nut against inner race 110, bearing elements 114, outer race 116, and thrust ring 48.

The axially rearward force applied by nut 16 will begin to frictionally lock the nut and inner race 110 to the body, and the inner race and the nut will be rotationally restrained with respect to the body. As the operator continues to rotate sleeve 18 in tightening direction 128 (FIG. 4C), jaws 24 will further tighten about the tool shank, and nut 16 will stop rotating.

Referring now to FIG. 4C, any additional torque applied by the operator in the jaw-closing direction will force inner bearing race tabs 136 out of their respective first recesses 138 and into second recesses 140, allowing sleeve 18 to rotate with respect to the nut and inner bearing race 110. Referring to FIG. 2, the rotation of front sleeve 18 moves front sleeve drive dogs 104 within their respective recesses 102 formed on nut 18. Drive dogs 104 rotate away from recess sides 148 towards recess sides 146. Simultaneously, cam surfaces 144 rotate away from tabs 134 so that tabs 134 are released into third recesses 142, thereby allowing distal ends 126 of first pawls 124 to engage ratchet teeth 122, as shown in FIG. 4B. At this point, both inner race 110 and nut 16 are rotationally locked to both outer race 116 and body 14 so that the nut is constrained against rotation in the jaw-opening direction 130. Engagement between the front sleeve third recesses 142 and the inner race pawl tabs 134 brings pawl distal ends 126 into locking engagement with outer race ratchet teeth 122. Outer race 116 is constrained against rotation with respect to body 14 because of the engagement between outer race tabs 118 and grooves (not shown) formed in body thrust ledge 52 (FIGS. 1A, 1B and 8). Therefore, the engagement between pawl distal ends 126 and ratchet teeth 122 prevents inner race 110 from rotating in jaw-opening direction 130. The locked engagement between inner race 110 and nut 16 ensures that when inner race 110 is constrained against rotation in the jaw-opening direction, so too is the nut. In this way, the jaws are prevented from opening inadvertently during use.

In the locked position, however, inner race 110, and therefore nut 16, may still rotate with respect to outer race 116 and body 14 in a chuck closing direction 128. During such rotation, front sleeve 18 drives the nut by means of two mechanisms. First, the contact between front sleeve drive dogs 104 and nut recess sides 146 (FIGS. 2 and 3) urges the nut to rotate in direction 128. Second, inner race pawl tabs 134 and 136 engage front sleeve recesses 142 and 140, which urges inner race 110 to rotate with front sleeve 18. Inner race tabs 108, which are engaged by nut flats 106 (FIGS. 2 and 3) also urge the nut to rotate in closing direction 128. In this way, the chuck jaws 24 continue to close as described above. When the jaws are in a fully tightened position, pawl distal ends 126 will ride over ratchet ring teeth 122, producing a clicking sound to notify the operator that the chuck is fully tightened.

Referring back to FIG. 1A, once the operator is satisfied that the jaws are sufficiently tightened about the tool shank, the operator may slide rear sleeve 20 into a rearward axial position. Moving rear sleeve 20 into a rearward axial position brings gear sleeve teeth 84 into engagement with gear ring teeth 53, and the engagement between teeth 84 and teeth 53 prevents the rotation of front sleeve 18 and rear sleeve 20 with respect to body 14. As such, the front and rear sleeves and the nut are further rotationally locked with respect to the body, thereby reducing any chance that the chuck jaws will loosen during operation.

Referring now to FIG. 1B, the operator may open the chuck jaws by first sliding rear sleeve 20 forward into its unlocked position. Once rear sleeve is located in the forward axial position, gear sleeve teeth 82 disengage gear ring teeth 53, and the operator may rotate both rear sleeve 20 and front sleeve 18 in opening direction 130 (FIGS. 4A-4C). As best seen in FIG. 4B, front sleeve 18 transfers this opening torque to inner race 110 at the engagement of tabs 134 and 136 in recesses 142 and 140, respectively. Because inner race pawl distal ends 126 engage outer race ratchet teeth 122 of outer race 116, which is rotationally fixed to the body, the inner race cannot rotate with the sleeve. Thus, upon application of sufficient torque to front sleeve 18 in opening direction 130, the front sleeve rotates with respect to the inner race and the nut. This rotation forces tabs 134 up onto cam surfaces 144, thereby disengaging first pawl distal ends 126 from ratchet teeth 122. Tabs 136 move from second recesses 140 into first recesses 138, and drive dogs 104 move from sides 146 to sides 148 of nut grooves 102. Thus, the sleeve moves to its first rotational position with respect to the nut, as shown in FIG. 4C, and the inner race and nut are free to rotate in direction 130 with respect to the outer race and chuck body 14. Accordingly, further rotation of sleeve 18 in the opening direction moves the jaws away from chuck central longitudinal axis 32, thereby opening the chuck.

The pawls and ratchet may be formed in any suitable configuration. Furthermore, the chuck may be realized in a variety of configurations whereby a bearing having a ratchet configuration is disposed between a sleeve, for example a nut or other suitable configuration, and the chuck body. For example, a chuck may include a body, a nut that is rotationally disposed about and axially movable with respect to the body, and an outer sleeve that engages the nut so that rotation of the sleeve also rotates the nut with respect on the body. The jaws may be received by the body in passageways, and the nut engages the jaws so that rotation of the nut drives the jaws towards and away from the chuck's axis. In this configuration, an outer sleeve may be permitted to rotate over a limited angular distance with respect to a second sleeve. A bearing including a ratchet configuration as discussed above may be disposed between the second sleeve and the chuck body. Depending on the chuck's configuration, the pawls and ratchet may be interchanged as appropriate.

While one or more preferred embodiments of the present invention have been described above, it should be understood that any and all equivalent realizations of the present invention are included within the scope and spirit thereof. Thus, the depicted embodiments are presented by way of example only and are not intended as limitations on the present invention. It should be understood that aspects of the various one or more embodiments may be interchanged either in whole or in part. Therefore, it is contemplated that any and all such embodiments are included in the present invention as may be fall within the literal or equivalent scope of the present disclosure.

What is claimed:

1. A chuck for use with a manual or powered driver having a rotatable drive shaft, the chuck comprising:
   (a) a generally cylindrical body having
      a central longitudinal axis,
      a nose section, and
      a tail section,
      the tail section being configured to rotate with the drive shaft and the nose section having an axial bore formed therein,
   (b) a plurality of jaws movably disposed with respect to the body in communication with the axial bore;
   (c) a nut rotatably mounted about the body and in driving engagement with the jaws so that rotation of the nut in a closing direction moves the jaws toward the central longitudinal axis and rotation of the nut in an opening direction moves the jaws away from the central longitudinal axis;
   (d) a bearing having
      a first race adjacent to the body and defining a ratchet ring,
      a second race adjacent to the nut and defining at least one pawl biased toward the ratchet ring, and
      at least one bearing element disposed between the first race and the second race,
      wherein the ratchet ring and the at least one pawl are configured so that when the at least one pawl engages the ratchet ring, the ratchet ring and the at least one pawl prevent the second race from rotating in the opening direction with respect to the first race; and
   (e) a sleeve rotatably mounted about the body and in driving engagement with the nut,
      wherein the sleeve is rotatable with respect to the pawl between a first rotational position and a second rotational position,
      wherein the sleeve comprises a front sleeve and a rear sleeve, and
      wherein the rear sleeve is slidable between a first axial position and a second axial position with respect to the front sleeve.

2. The chuck as in claim 1,
wherein the body further has a gear ring defining a plurality of radially outward extending teeth,
   wherein the front sleeve is in driving engagement with the pawl and rotatable with respect to the nut and the pawl between the first rotational position and the second rotational position,
   the rear sleeve defines a plurality of radially inward extending teeth,
   the rear sleeve being rotationally fixed to the front sleeve, and
wherein the gear ring teeth and the rear sleeve teeth lockingly engage each other when the rear sleeve is located in the second axial position so as to rotationally immobilize the front and rear sleeves with respect to the body.

3. The chuck as in claim 1,
wherein the front sleeve defines a inner surface that further defines at least one cam surface disposed with respect to the at least one pawl so that the cam surface disengages the pawl from the ratchet ring when the front sleeve is in the first rotational position, and
wherein the cam surface releases the pawl to engage the ratchet ring when the front sleeve is in the second rotational position.

4. The chuck as in claim 1,
wherein the nut defines threads formed thereon, the threads engaging corresponding threads formed on the jaws such that rotation of the nut about the body moves the jaws toward or away from the central longitudinal axis.

5. The chuck as in claim 1,
wherein the nut defines threads formed thereon, the threads engaging corresponding threads formed on the jaws such that rotation of the nut about the body moves the jaws toward or away from the central longitudinal axis,
wherein the pawl is deflectable, and
wherein the pawl and the ratchet ring are configured so that when the pawl engages the ratchet ring, the pawl and ratchet ring permit the second race to rotate in the closing direction with respect to the first race but prevent the second race from rotating in the opening direction with respect to the first race.

6. The chuck as in claim 1,
wherein the front sleeve is in operative communication with the nut so that the front sleeve rotationally drives the nut but is rotatable with respect to the nut and the pawl between the first rotational position and the second rotational position, wherein the front sleeve defines a cam surface disposed with respect to the pawl so that the cam surface disengages the pawl from the ratchet when the front sleeve is in the first rotational position, wherein the cam surface releases the pawl to engage the ratchet when the front sleeve is in the second rotational position, wherein the rear sleeve is rotationally fixed to the front sleeve, and wherein the rear sleeve rotationally immobilizes the front sleeve to the body when the rear sleeve is located in the second position.

7. A chuck for use with a manual or powered driver having a rotatable drive shaft, the chuck comprising:
(a) a generally cylindrical body having
   a central longitudinal axis,
   a nose section having an axial bore formed therein, and
   a tail section configured to rotate with the drive shaft;
(b) a plurality of jaws movably disposed with respect to the body in communication with the axial bore;
(c) a sleeve rotatably mounted about the body in operative communication with the jaws so that rotation of the sleeve in a closing direction moves the jaws toward the central longitudinal axis of the body and rotation of the sleeve in an opening direction moves the jaws away from the central longitudinal axis,
   wherein the sleeve comprises a front sleeve and a rear sleeve, and
   wherein the rear sleeve is slidable between a first axial position and a second axial position with respect to the front sleeve, and
(c) a bearing having
   a first race adjacent to the body and defining a ratchet ring,
   a second race adjacent to the sleeve and defining at least one pawl biased toward the ratchet ring, and
   at least one bearing element disposed between the first race and the second race,
   wherein the ratchet ring and the at least one pawl are configured so that when the at least one pawl engages the ratchet ring, the ratchet ring and the at least one pawl prevent the second race from rotating in the opening direction with respect to the first race.

8. The chuck of claim 7 further comprising a nut,
wherein the front sleeve is in operative communication with the nut so that the front sleeve rotationally drives the nut but is rotatable with respect to the nut between a first rotational position and a second rotational position,
wherein the front sleeve defines an inner surface that further defines at least one cam surface disposed with respect to the at least one pawl so that the at least one cam surface disengages the at least one pawl from the ratchet ring when the front sleeve is in the first rotational position, and the front sleeve releases the at least one pawl to engage the ratchet ring when the front sleeve is in the second rotational position,
wherein the rear sleeve is rotationally fixed to the front sleeve, and
wherein the rear sleeve rotationally immobilizes the front sleeve with respect to the body when the rear sleeve is located in the second axial position.

9. The chuck as in claim 7,
wherein the first race is rotationally fixed with respect to the body.

10. The chuck as in claim 7,
wherein the first race includes a plurality of tabs extending radially therefrom, each of the tabs being received by a corresponding groove formed in the body.

11. The chuck as in claim 7 further comprising a nut, wherein the second race is rotationally fixed to the nut.

12. The chuck as in claim 7 further comprising a nut,
wherein the second race includes a plurality of tabs extending therefrom, each of the tabs being received by a corresponding groove formed in the nut.

13. The chuck as in claim 7 further comprising a nut wherein the front sleeve is in operative communication with the nut so that the front sleeve rotationally drives the nut but is rotatable with respect to the nut between the first rotational position and the second rotational position, wherein the front sleeve rotationally drives the nut through the second race.

14. The chuck as in claim 7, the chuck further comprising a nut, and
wherein the front sleeve is in operative communication with the nut so that the front sleeve rotationally drives the nut but is rotatable with respect to the nut between the first rotational position and the second rotational position,
wherein the second race includes at least one first deflectable pawl and at least one second deflectable pawl,
wherein the second pawl is biased toward an inner circumferential surface of the front sleeve, and
wherein the inner circumferential surface defines a first recess and a second recess disposed with respect to the second pawl so that the second pawl is received by the first recess when the front sleeve is in a first rotational position and the second pawl is received by the second recess when the front sleeve is in a second rotational position.

15. The chuck as in claim 14,
wherein the inner circumferential surface of the front sleeve defines at least one cam surface and at least one third recess disposed adjacent to a respective one of the at least one cam surface and with respect to the at least one first pawl so that the at least one first pawl engages the at least one cam surface when the front sleeve is in the first rotational position and so that the at least one first pawl is received by the at least one third recess when the front sleeve is in the second rotational position.

16. The chuck as in claim 14 further comprising a nut,
wherein the front sleeve is in operative communication with the nut so that the front sleeve rotationally drives the nut but is rotatable with respect to the nut between the first rotational position and the second rotational position,
wherein the inner circumferential surface of the front sleeve defines at least one cam surface and at least one recess disposed adjacent to the cam surface such that the at least one first pawl engages the at least one cam surface when the front sleeve is in the first position and the first pawl is received by the at least one recess when the front sleeve is in the second position.

17. The chuck as in claim 7 further comprising a nut,
wherein the front sleeve is in operative communication with the nut so that the front sleeve rotationally drives the nut but is rotatable with respect to the nut between the first rotational position and the second rotational position, the rear sleeve being rotationally fixed to the front sleeve,
wherein the body further has a gear ring defining a plurality of radially outward projecting teeth, wherein the rear sleeve defines a plurality of radially inward projecting teeth, and wherein the rear sleeve teeth lockingly engage the gear ring teeth when the rear sleeve is placed in the second axial position, and the locking engagement between the gear ring teeth and the rear sleeve teeth angularly immobilizes the front sleeve and the rear sleeve with respect to the body.

18. A chuck for use with a manual or powered driver having a rotatable drive shaft, the chuck comprising:

(a) a generally cylindrical body having
a central longitudinal axis,
a nose section, a tail section,
a gear ring, and
a plurality of passageways formed therethrough,
the tail section being configured to rotate with the drive shaft, the nose section having an axial bore formed therein, and the plurality of passageways intersecting the axial bore, (b) a plurality of jaws movably disposed in the passageways;

(c) a generally cylindrical front sleeve rotatably mounted about the body;

(d) a generally cylindrical rear sleeve rotatably mounted about the body;

(e) a nut rotatably mounted about the body and in driving engagement with the jaws so that rotation of the nut in a closing direction moves the jaws toward the central longitudinal axis of the body and rotation of the nut in an opening direction moves the jaws away from the central longitudinal axis; and (f) a bearing having
a first race rotationally fixed to the body and defining a ratchet ring,
a second race rotationally fixed to the nut and defining at least one deflectable first pawl biased toward the ratchet ring , and
a plurality of bearing elements disposed between the first race and the second race, and
wherein the ratchet ring and the at least one first pawl are configured so that when the at least one first pawl engages the ratchet ring, the ratchet ring and the at least one first pawl prevent the second race from rotating in the opening direction with respect to the first race but permit the second race to rotate in the closing direction with respect to the first race,
wherein the front sleeve is in operative communication with the nut so that the sleeve rotationally drives the nut but is rotatable with respect to the nut between a first rotational position and a second rotational position,
wherein the front sleeve defines at least one cam surface disposed with respect to the at least one first pawl so that the at least one cam surface disengages the at least one first pawl from the ratchet when the front sleeve is in the first rotational position and releases the at least one first pawl to engage the ratchet when the front sleeve is in the second rotational position,
wherein the gear ring defines a plurality of radially outwardly extending teeth,
wherein the rear sleeve defines a plurality of radially inwardly extending teeth and the rear sleeve is rotationally fixed to the front sleeve, and the rear sleeve is slidable between a first axial position and a second axial position with respect to the front sleeve, and
wherein the rear sleeve teeth engage the gear ring teeth when the rear sleeve is placed in the second axial position, the engagement between the rear sleeve teeth and the gear ring teeth angularly immobilizes the front and rear sleeves with respect to the body.

19. The chuck as in claim 18,
wherein the first race includes at least one second deflectable pawl, wherein the at least one second pawl is biased toward an inner circumferential surface of the front sleeve and wherein the inner circumferential surface defines at least one first recess and at least one second recess disposed with respect to the first race so that the at least one second pawl is received by the at least one first recess when the front sleeve is in the first position and so that the at least one second pawl is received by the at least one second the recess when the front sleeve is in the second position.

20. A chuck for use with a manual or powered driver having a rotatable drive shaft, the chuck comprising:

(a) a generally cylindrical body having
a central longitudinal axis,
a nose section, and
a tail section,
the tail section being configured to rotate with the drive shaft and the nose section having an axial bore formed therein, (b) a plurality of jaws movably disposed with respect to the body in communication with the axial bore;

(c) a nut rotatably mounted about the body and in driving engagement with the jaws so that rotation of the nut in a closing direction moves the jaws toward the central longitudinal axis and rotation of the nut in an opening direction moves the jaws away from the central longitudinal axis; and (d) a sleeve rotatably mounted about the body and in driving engagement with the nut,
wherein the sleeve is rotatable with respect to the nut between a first rotational position in which the nut is rotatable with respect to the body and a second rotational position in which the nut is rotatably fixed to the body in the opening direction,
wherein the sleeve comprises a front sleeve and a rear sleeve, and
wherein the front and rear sleeves are rotatably fixed to each other and one of the front and rear sleeves is slidable between a first axial position and a second axial position with respect to the other of the front and rear sleeves.

21. The chuck as in claim 20,
wherein the body further has a gear ring defining a plurality of radially outward extending teeth,
wherein the rear sleeve defines a plurality of radially inward extending teeth, and
wherein the gear ring teeth and the rear sleeve teeth lockingly engage each other when the rear sleeve is located in the second axial position so as to rotationally immobilize the front and rear sleeves with respect to the body.

* * * * *